US009638172B2

(12) United States Patent
Nielsen

(10) Patent No.: US 9,638,172 B2
(45) Date of Patent: May 2, 2017

(54) ARRANGEMENT OF A SWITCHGEAR OF A WIND TURBINE

(71) Applicant: VESTAS WIND SYSTEMS A/S, Aarhus N (DK)

(72) Inventor: Jesper Nielsen, Risskov (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 14/406,209

(22) PCT Filed: Jun. 7, 2013

(86) PCT No.: PCT/DK2013/050181
§ 371 (c)(1),
(2) Date: Dec. 6, 2014

(87) PCT Pub. No.: WO2013/182205
PCT Pub. Date: Dec. 12, 2013

(65) Prior Publication Data
US 2015/0152850 A1    Jun. 4, 2015

Related U.S. Application Data

(60) Provisional application No. 61/657,329, filed on Jun. 8, 2012.

(30) Foreign Application Priority Data

Jun. 28, 2012   (DK) ................................ 2012 70375

(51) Int. Cl.
*H02H 9/04*    (2006.01)
*F03D 9/00*    (2016.01)
(Continued)

(52) U.S. Cl.
CPC ............. *F03D 9/005* (2013.01); *F03D 80/82* (2016.05); *H02J 3/38* (2013.01);
(Continued)

(58) Field of Classification Search
CPC ....................................................... F03D 9/00
(Continued)

(56) References Cited

U.S. PATENT DOCUMENTS 2,943,717 A * 7/1960 Latzko ...................... E04H 5/04
52/234
8,503,443 B2 * 8/2013 Lovmand ................ F03D 7/047
290/44

(Continued)

FOREIGN PATENT DOCUMENTS

CN    101871433 A    10/2010
CN    202091124 U    12/2011
(Continued)

OTHER PUBLICATIONS

International Search Report for PCT/DK2013/050181, Sep. 19, 2013.
Danish Search Report for PA 2012 70375, Jan. 31, 2013.

*Primary Examiner* — Joseph Waks
(74) *Attorney, Agent, or Firm* — Patterson + Sheridan, LLP

(57) ABSTRACT

A wind turbine with a switchgear arrangement is described. The wind turbine includes a tower, a rotor supported at an upper end of the tower, a generator, a transformer for increasing the voltage output of the generator prior to supplying a collector grid, and switchgear arranged between the transformer and the collector grid. The switchgear includes a first switching device associated with the transformer, and a second switching device associated with one or more cables connecting the wind turbine to another wind turbine in the collector grid. The first switching device is (Continued)

connected to, but located remotely from, the second switching device.

23 Claims, 5 Drawing Sheets

(51) Int. Cl.
  *H02J 3/38* (2006.01)
  *F03D 80/80* (2016.01)
(52) U.S. Cl.
  CPC ..... *F05B 2240/142* (2013.01); *F05B 2240/95* (2013.01); *Y02E 10/72* (2013.01); *Y10T 29/49009* (2015.01); *Y10T 307/724* (2015.04)
(58) Field of Classification Search
  USPC .......................................................... 290/44
  See application file for complete search history.

(56) References Cited

U.S. PATENT DOCUMENTS

| | | | | |
|---|---|---|---|---|
| 8,683,753 | B2* | 4/2014 | Bachorz | E04B 1/80 52/264 |
| 2009/0045171 | A1* | 2/2009 | Montich | H01H 31/003 218/140 |
| 2010/0327599 | A1* | 12/2010 | Nielsen | F03D 9/003 290/55 |
| 2011/0134574 | A1 | 6/2011 | Ritter | |
| 2011/0221205 | A1 | 9/2011 | Haar et al. | |
| 2012/0139256 | A1 | 6/2012 | Gajewski et al. | |
| 2012/0224295 | A1* | 9/2012 | Bertolotti | F03D 11/00 361/301.2 |
| 2014/0035289 | A1* | 2/2014 | Eichler | H05K 7/1432 290/55 |
| 2015/0108764 | A1* | 4/2015 | Moeller | F03D 1/001 290/55 |

FOREIGN PATENT DOCUMENTS

| | | | | |
|---|---|---|---|---|
| DE | 10013442 C1 * | 10/2001 | | B64F 1/36 |
| JP | 2006009596 A | 1/2006 | | |
| WO | 01/46583 A2 | 6/2001 | | |
| WO | 2005/040605 A1 | 5/2005 | | |
| WO | 2009/003508 A1 | 1/2009 | | |
| WO | 2009/127393 A1 | 10/2009 | | |
| WO | 2010/066303 A1 | 6/2010 | | |
| WO | 2010/103114 A1 | 9/2010 | | |

* cited by examiner

ARRANGEMENT OF A SWITCHGEAR OF A WIND TURBINE

TECHNICAL FIELD

The present invention relates to switchgear for wind turbines, and in particular to new schemes for locating the switchgear, housing the switchgear and connecting the switchgear. The present invention also relates to a method of constructing a wind power plant incorporating the switchgear.

BACKGROUND

Wind power plants or 'wind farms' generally comprise a number of wind turbines that are electrically connected together to form a collector grid. The output from this collector grid is typically connected to a substation, which includes a step-up transformer for increasing the voltage to a suitable level for supplying a distribution grid.

Each wind turbine in the collector grid includes its own step-up transformer, also referred to herein as the 'main transformer', which increases the voltage output from the wind turbine generator to a higher level for supplying the collector grid. Each wind turbine also includes switchgear such as a circuit breaker or a switch-fuse device for protecting the electrical equipment inside the wind turbine in the event of a fault condition. The switchgear generally also comprises one or more cable switching devices, which comprise disconnector switches, and which are associated with the incoming and/or outgoing cables of the collector grid. These so-called 'disconnectors' allow the wind turbine to be disconnected from the connector grid for servicing purposes or otherwise.

Switchgear equipment for wind turbines is generally in the form of 'panels'. Typically there will be a circuit breaker panel, which is connected to the main transformer, and one or more 'disconnector' panels, also known as 'cable panels', which connect the wind turbine to the next wind turbine in the collector grid. In practice, the panels may also incorporate other protective devices including earthing switches and/or surge arrestors. The circuit breaker panel may also include a disconnector switch.

The various panels forming the switchgear are arranged side-by-side and connected together via direct busbar connections. The switchgear may be supplied as a compact unit in which the panels are already connected together in this way, or in the form of separate modules, which are connected together onsite via the integral busbars. In existing wind turbines, the switchgear is located inside the base of the wind turbine tower.

There is a continual drive to increase the size and output of wind turbines. In turn, the rated voltage level in wind farms has steadily increased over recent years. Voltage levels of 36, 40.5 kV and 72 kV are now envisaged for the future. Moving to higher voltages results in a necessary increase in the size of the wind turbine equipment such as the transformer, and also of the switchgear required to protect this equipment. Housing such large equipment within the confined space inside the wind turbine tower then becomes a challenge, and there is a need to develop innovative new ways of arranging the switchgear.

It is against this background that the present invention as been made.

According to the present invention there is provided a wind turbine comprising: a tower; a rotor supported at an upper end of the tower; a generator; a transformer for increasing the voltage output of the generator prior to supplying a collector grid; and switchgear arranged between the transformer and the collector grid, the switchgear comprising a first switching device associated with the transformer, and a second switching device associated with one or more cables connecting the wind turbine to another wind turbine in the collector grid, wherein the first switching device is connected to, but located remotely from, the second switching device.

By separating the switchgear into electrically connected devices that can be arranged at different physical locations within the vicinity of the wind turbine, the present invention provides increased flexibility in terms of locating the switchgear. For example, part of the switchgear may be located inside the tower and part of the switchgear may be located outside the tower. Alternatively, parts of the switchgear may be arranged at different locations within the tower. For example part of the switchgear may be located at the base of the tower, and another part may be located on a platform inside the tower. The various parts of the switchgear may be connected together by electrical cables. This provides a more flexible solution than the busbar connections in the prior art that require the switchgear panels to be located side-by-side and at the same physical location.

The first switching device preferably comprises a circuit breaker for protecting the transformer in the event of a fault condition such as a short-circuit, an over current or an earth fault (ground fault). The first switching device preferably also includes a disconnector switch connected in series with the circuit breaker. The first protection device is preferably in the form of a 'circuit breaker panel'. The second switching device preferably comprises at least one disconnector associated with the incoming and/or the outgoing grid cables for connecting and disconnecting the wind turbine to/from the collector grid.

In a preferred embodiment of the present invention, the first switching device is located inside the tower and the second switching device is located outside the tower. Locating part of the switchgear outside the tower frees up space inside the tower for other equipment or otherwise increases the accessibility of the equipment inside the tower for service personnel. This becomes increasingly important as the physical size of the switchgear equipment increases to accommodate higher rated voltages.

The first switching device may be located at the base of the tower or on a platform above or below the base of the tower. The second switching device may be located on a platform outside the tower. The platform may be a gallery platform of the tower or part of a foundation on which the tower is supported, such as an offshore foundation. The foundation may include a transition piece upon which the tower stands, and the second switching device may be located within the transition piece. The second protection device may be pre-installed inside the transition piece, which facilitates installation because the second protection device may then be lifted onto the foundation with the transition piece and a separate lifting stage is then no required.

Most service operations on the switchgear are performed on the circuit breaker panel as opposed to the cable disconnector panels. It is therefore convenient to locate the circuit breaker panel inside the wind turbine where it will be in relatively close proximity to the other operating equipment of the wind turbine. This facilitates service operations. As disconnector panels require less frequent servicing, these can be located in less accessible space, or space remote from where the usual service operations take place, such as outside the wind turbine for example. In addition, most operations on the disconnector panels are performed remotely, typically via SCADA (supervisory control and data acquisition), and so the location of these components is less important than the location of the circuit breaker panel.

Preferably the first switching device is located adjacent the transformer. The first switching device may include additional protective equipment such as surge arrestors and it is desirable to have these as close to the transformer as possible. If the first switching device was located outside the wind turbine and connected to the transformer by a long cable, for example, this cable would be susceptible to lightning strikes. Whilst such lighting strikes are rare, locating the first switching device adjacent the transformer avoids this risk.

The second switching device may conveniently be located inside a container. If the container is to be located outside the tower, then a substantially weatherproof container may be employed. A number of advantages flow from having the switchgear equipment located in a container. For example the equipment inside the container can be connected together and tested before being installed on site. Various optional and advantageous features of the container, which are discussed below, facilitate quick and easy connection of the containerised equipment to the equipment inside the wind turbine and to the collector grid. In the event of a fault developing with the containerised equipment, the entire container can be replaced rather than replacing or repairing the equipment inside the container. The containerised equipment may subsequently be repaired offsite. This presents significant benefits, particularly in an offshore context where environmental conditions can be extreme and it is generally desirable to minimise service time onsite. Replacing the entire container also reduces the downtime of the wind turbine.

The present invention also provides, within the same inventive concept, a weatherproof container configured to house switchgear components for a wind turbine.

To facilitate connectivity of the containerised switchgear equipment, the container preferably includes at least one hatch for providing access to one or more cable connection points of the second switching device. The wind turbine cable and the incoming and outgoing grid cables connect to the respective connection points. The connection points preferably comprise sockets, and the ends of the cables are preferably fitted with complementary-shaped plug connectors allowing quick and easy connection to the sockets.

The or each hatch may be provided in the base of the container. So that the hatches are accessible, the container may be supported on the platform with its base raised above the platform. To this end, the container may be supported on legs or other such supports. The container may comprise retractable or detachable legs that can be retracted or detached for convenience during transport of the container and extended or attached on site to allow access to the hatches. Retractable legs could also be extended specifically to provide access to the hatches when required, with the legs remaining retracted at other times such that the base of the container is supported directly on the platform. Alternatively, the legs may be part of a platform on which the container is supported. This solution may be cheaper than integrating the legs with the container.

The container may have one or more doors or a removable panel, for example a removable side panel, to allow access to the containerised equipment for maintenance purposes. Bolts or other fasteners may be used to secure the side panel to the container, which could be removed or otherwise unfastened in order to remove the panel. Rather than being removable, the panel may alternatively slide sideways or lift upwards. Moving the panel in any of these ways provides service access to the containerised equipment when required and means that the service space does not need to be factored into the size of the container. Accordingly, a relatively small container may be used, just large enough to house the equipment, without the requirement for additional service space inside the container around the equipment.

If the container is to house just the disconnector equipment, it is possible to use a very small container, which advantageously may be substantially smaller than a standard shipping container. This again allows greater flexibility in terms of locating the container, and allows the container easily to fit within the transition piece of an offshore wind turbine. A small container is also less unsightly than, for example, a large shipping container located next to the wind turbine. The container may be substantially cubic, for example with a dimension of about 2 $m^3$ or less. Alternatively, the container may be elongate and have approximate dimensions of 1.5×2×2.5 m (i.e. a volume of approximately 7.5 $m^3$) or 1.5×2×3 m (i.e. a volume of approximately 9 $m^3$). Accordingly, the container preferably has a volume of approximately 9 $m^3$ or less, which is significantly less than the volume of a standard 20 ft ISO shipping container. The container may be pre-installed inside the transition piece to facilitate installation as mentioned above.

The switchgear components inside the container may be gas-insulated. Typically sulphur hexafluoride ($SF_6$) gas is employed. The container may include a pressure-relief device for relieving pressure in the event of an overpressure within the container. The pressure relief device preferably comprises at least one pressure relief flap.

The wind turbine of the present invention preferably has a rating of 7.0 MW (megawatts) or above. The main transformer is preferably configured to increase the voltage from 3.3 kV to 33 kV or 66 kV. The first and second switching devices preferably have a rating of 630 A (Amperes) or 1250 A in a 36 kV arrangement or 1250 A or 2000 A in a 72 kV arrangement.

Within the same inventive concept, the present invention provides a wind power plant comprising a plurality of wind turbines as described above. The wind turbines are preferably connected together to form a collector grid. The connections to the collector grids are preferably made via the respective second switching devices, which may be configured to receive the respective incoming and outgoing grid cables.

Another advantage of containerised switchgear is that the container may be installed on an offshore wind turbine foundation prior to erecting the wind turbine. Often the foundations are built a year or more before the turbines are constructed, and so this conveniently allows the cables that interconnect the wind turbines in the collector grid to be tested before the wind turbines are erected. This results in increased efficiency and may reduce the time required to construct the wind power plant.

Accordingly, the invention also comprises a method of constructing an offshore wind power plant comprising: installing a plurality of offshore foundations in an array: providing containerised switchgear on each of the respective foundations; and connecting the containerised switchgear on the respective foundations to the containerised switchgear on another foundation in the array via electric cables prior to erecting wind turbines on the respective foundations. The method preferably comprises electrically testing the containerised switchgear and the interconnecting cables prior to erecting the wind turbines.

The method may further comprise erecting a wind turbine on a foundation: providing a switchgear component inside the wind turbine: and electrically connecting the switchgear component to the containerised switchgear on said foundation. The switchgear component inside the wind turbine may be installed after the tower has been erected on the foundation. Alternatively, the tower may be built around the switchgear component.

As a further alternative, the switchgear component may be pre-installed inside a section of the tower and the method may comprise transporting said section including the pre-installed switchgear component to the foundation for assembly with other tower sections to form the tower. The container may be pre-installed inside the transition piece. Pre-installing the switchgear equipment in this way facilitates installation because it dispenses with the requirement for separate offshore lifting processes to lift the switchgear equipment onto the foundation.

The switchgear component inside the wind turbine is preferably a circuit breaker or equivalent device configured to protect the electrical equipment of the wind turbine. The component is preferably connected between the main transformer of the wind turbine and the containerised switchgear outside the wind turbine. The switchgear component is preferably located adjacent the main transformer, for reasons that have already been described above. The method may advantageously comprise electrically connecting the switchgear component to the main transformer and testing the connected equipment as a combined unit prior to connecting the equipment with the other wind turbine equipment and with the containerised switchgear. These electrical tests may conveniently be performed offsite before the equipment is transported to the offshore foundation. The method may comprise pre-installing the transformer in a tower section together with the switchgear component prior to transporting the tower section to the foundation.

As the present invention relates broadly to the concept of separating the switchgear, the invention may also be expressed in terms of the switchgear without making direct reference to the wind turbine. Accordingly, the present invention also provides switchgear for location between a main transformer of a wind turbine and another wind turbine in a collector grid, the switchgear comprising a first switching device for associating with the main transformer, and a second switching device for associating with one or more cables connecting the wind turbine to the other wind turbine in the collector grid, wherein the first switching device is connected to, but located remotely from, the second switching device.

BRIEF DESCRIPTION OF THE DRAWINGS

In order that the present invention may be more readily understood, an example of the present invention will now be described, by way of non-limiting example only, with reference to the following figures, in which.

DETAILED DESCRIPTION

Figure 1:
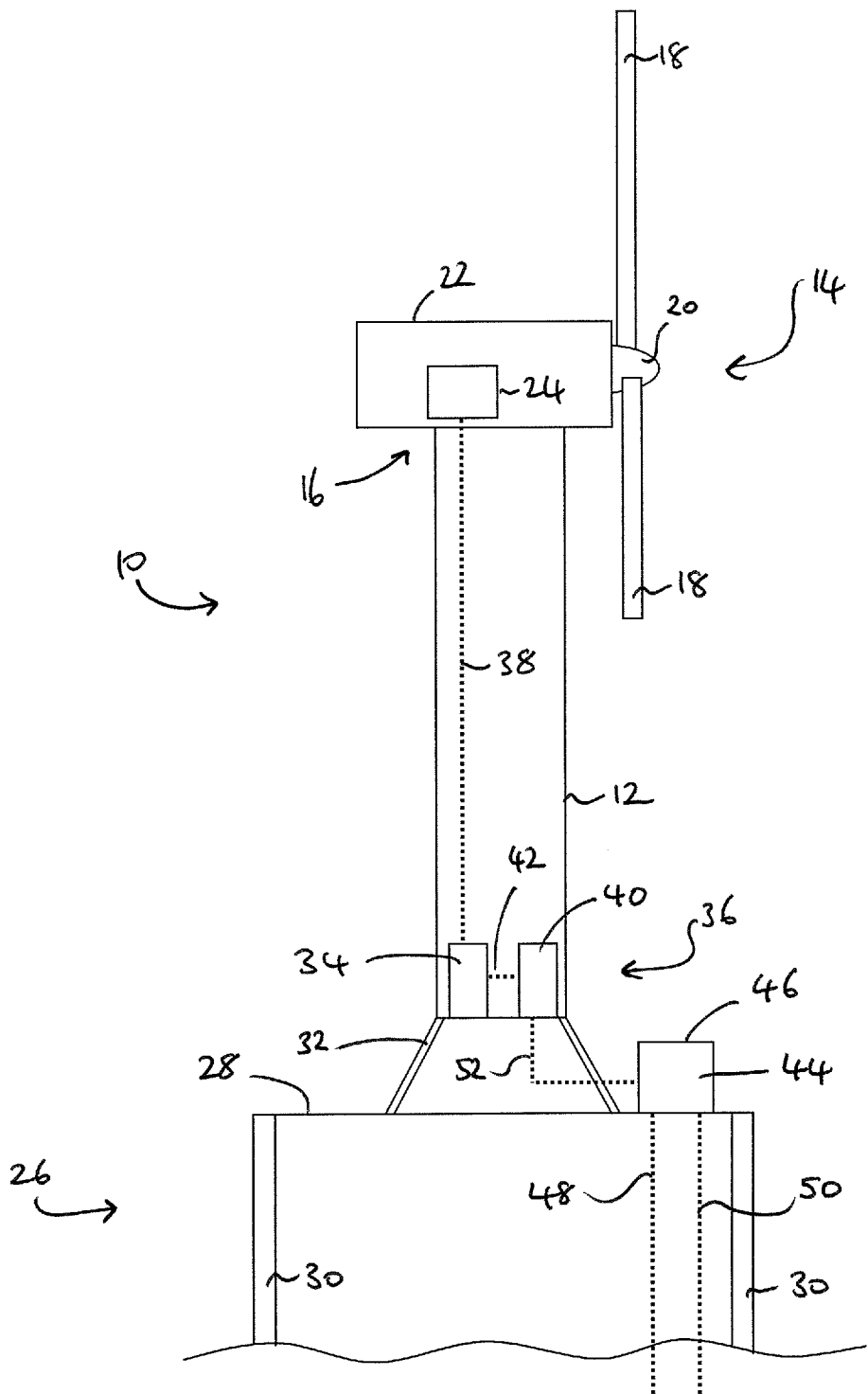
FIG. 1 is a schematic view of an offshore wind turbine in accordance with a first embodiment of the present invention.

Referring first to FIG. 1, an offshore wind turbine 10 in accordance with a first embodiment of the present invention comprises a tower 12 supporting a rotor 14 at its upper end 16. The rotor 14 comprises a plurality of rotor blades 18, which are mounted to a hub 20. The hub 20 is mounted to a nacelle 22, which houses a generator and other electrical equipment, represented schematically by the box 24 in FIG. 1.

The wind turbine 10 is located on an offshore foundation 26, which includes a platform 28 that is supported on a plurality of pillars 30 that are piled into the seabed. A transition piece 32 is provided on the platform 28 and the tower 12 stands on top of the transition piece 32.

An oil-filled main transformer 34 is located inside the base 36 of the tower 12 and is electrically connected to the equipment 24 inside the nacelle 22 via a set of cables 38, which extend vertically inside the tower 12. A first switchgear device 40, in this case a $SF_6$-insulated circuit breaker panel, is also located in the base 36 of the tower 12 adjacent the transformer 34, and is connected to the transformer 34 via cables or a busbar 42. In practice, other electrical equipment such as a power converter and monitoring and control equipment would also be located inside the tower 12, however these are not shown in the figures for reasons of clarity.

A second switchgear device 44 is housed in a weather-proof container 46, which is located on the platform outside the tower. The second switchgear device 44 comprises a pair of disconnector switches associated respectively with an incoming grid cable 48 and an outgoing grid cable 50. The grid cables 48, 50 connect the wind turbine 10 to a collector grid as described in further detail later, and the disconnector switches allow the wind turbine 10 to be disconnected from the collector grid, for example when service operations on the wind turbine 10 are undertaken, and/or in the event of faults.

The disconnector switches are connected to the circuit breaker panel 40 inside the wind turbine tower 12 via an electric cable 52, referred to herein as the "wind turbine cable". The container 46 is up to fifty meters away from the circuit breaker panel 40 in this example. Traditionally the circuit breaker and the disconnectors comprising the wind turbine switchgear are located in the same physical location, arranged side-by-side and connected via busbar connections. Normally such a combined switchgear unit is located inside the tower 12. Separating the switchgear 40, 44 in accordance with the present invention represents a significant departure from the prior art and allows parts of the switchgear to be located remotely from other parts, as shown in FIG. 1, which provides greater flexibility for locating the switchgear 40, 44.

Figure 2:
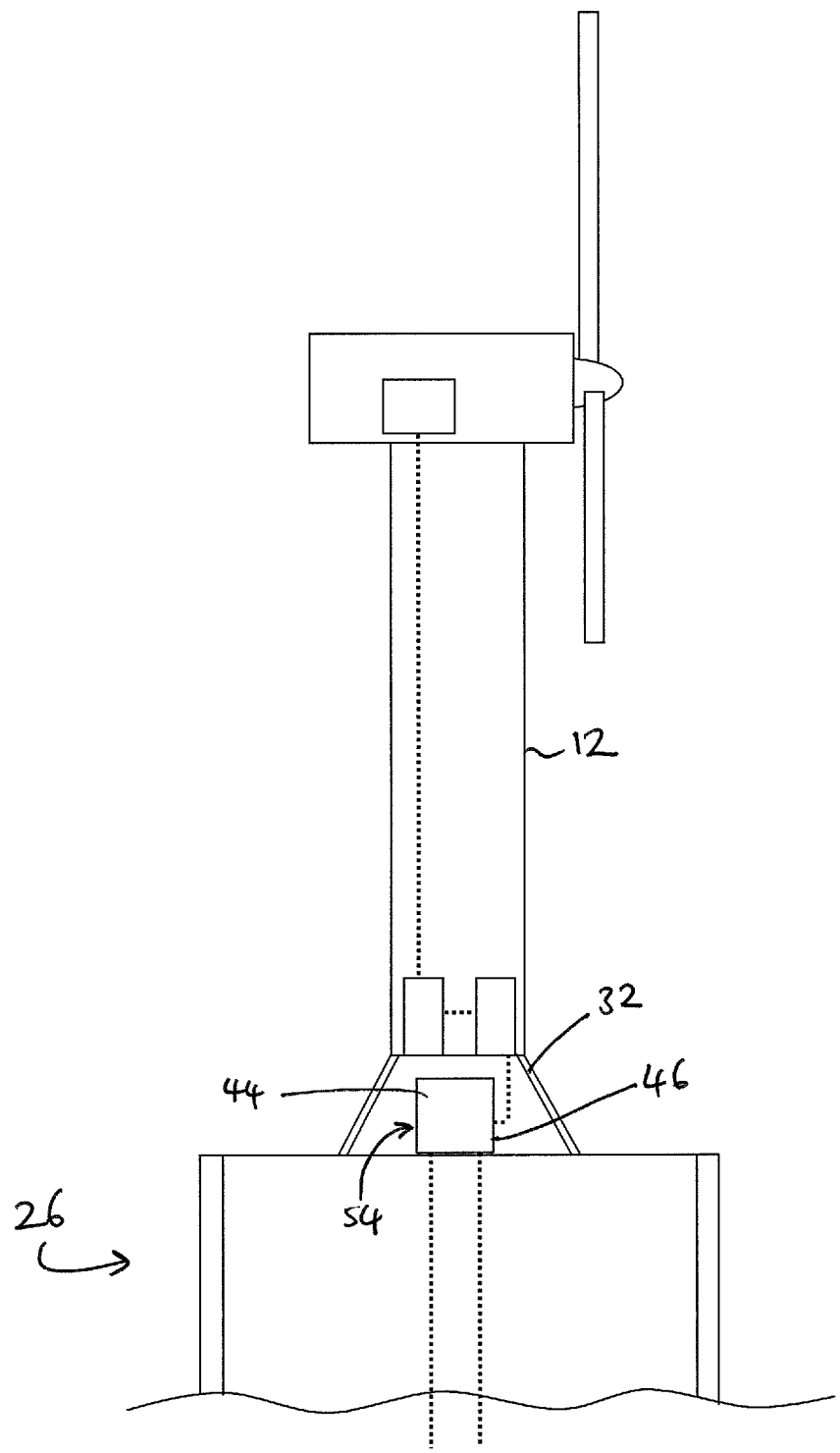
FIG. 2 is a schematic view of an offshore wind turbine in accordance with a second embodiment of the present invention.

FIG. 2 shows a second embodiment of the present invention in which the containerised switchgear 44 is located within the transition piece 32 of the foundation 26. This provides a convenient location for the container 46, below the tower 12, and at least partially obscures the container 46 from view so as to detract less from the visual appearance of the wind turbine 10. The transition piece 32 in this example has open sides, but in other examples the transition piece 32 may define a substantially enclosed or partially enclosed interior, which would further obscure the container 46 from view. Locating the container within the transition piece also provides additional protection for the container 46 against the elements and provides shelter for service personnel during servicing of the containerised switchgear equipment 44.

The container 46 in this example is preferably substantially cubic and has dimensions of approximately 2×2×2 m3, which it will be appreciated is substantially smaller than a standard ISO shipping container. The container 46 is designed to accommodate the disconnector switches with relatively little clearance between the disconnector switches and the container walls. This ensures that the container 46 is as compact as possible, which provides efficiencies in terms of transportation and minimises any perceived adverse visual impact on the wind turbine 10. The small size of the container 46 also allows it to fit conveniently within the transition piece 32 if required, as discussed above.

To facilitate servicing, the compact container 46 has a side panel 54 that can be removed. The removable side panel 54 provides service access to the disconnector switches without having to build this service space into the internal volume of the container 46. Further features of the container 46 will now be discussed with reference to FIG. 3, which shows the container 46 with the side panel 54 removed.

Figure 3:
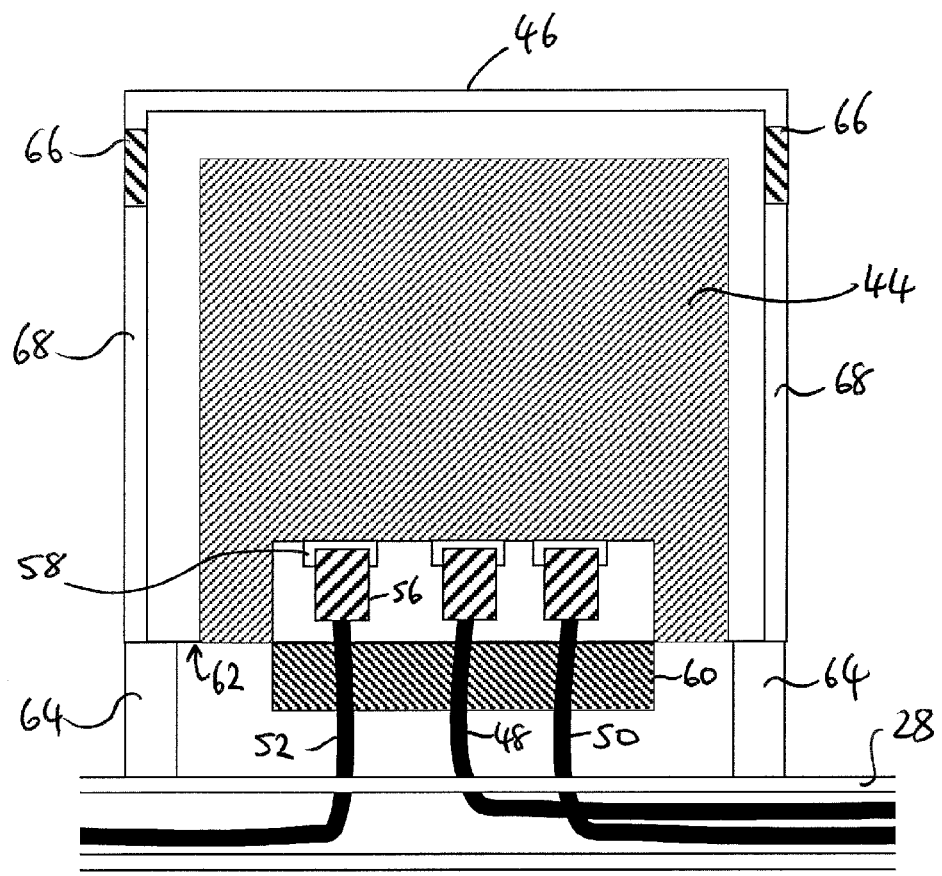
FIG. 3 is a schematic view of containerised switchgear in accordance with the present invention.

Referring to FIG. 3, the container 46 is designed to allow quick and easy connectivity of the grid cables 48, 50 to the wind turbine 10. Accordingly, end terminations in the form of plugs 56 are fitted to the ends of the wind turbine cable 52 and to the ends of the incoming and outgoing grid cables 48, 50. These plugs 56 are simply inserted into corresponding sockets 58 of the disconnector switches. A hatch 60, which is shown open in FIG. 3, is provided in the base 62 of the container 46 to provide access to the sockets 58. The cables 48, 50, 52 are routed beneath the platform 28 to the container 46 to avoid a trip hazard on the platform 28.

The container 46 is supported on legs 64, which serve to raise the base 62 of the container 46 above the platform 28 so that the hatch 60 is readily accessible. The legs 64 are detachable from the container 46 to facilitate transportation of the container 46. Installing the containerised switchgear 44 is straightforward, and simply requires opening the hatch 60 and connecting the cables 48, 50, 52. In the event of a fault occurring in the second switchgear 44, the entire container 46 can be quickly disconnected and replaced with a similar container, which is easily reconnected in the same way. The faulty container 46 may then be repaired offsite.

If service operations are to be performed onsite on the containerised switchgear 44, then one or more side panels of the container 46 may be removed to provide service access to the switchgear 44. As mentioned above, FIG. 3 shows the container 46 with a side panel removed. The container 46 also includes pressure relief flaps 66 in the sidewalls 68, which automatically open to relieve excess pressure in the container 46 if required.

Figure 4:
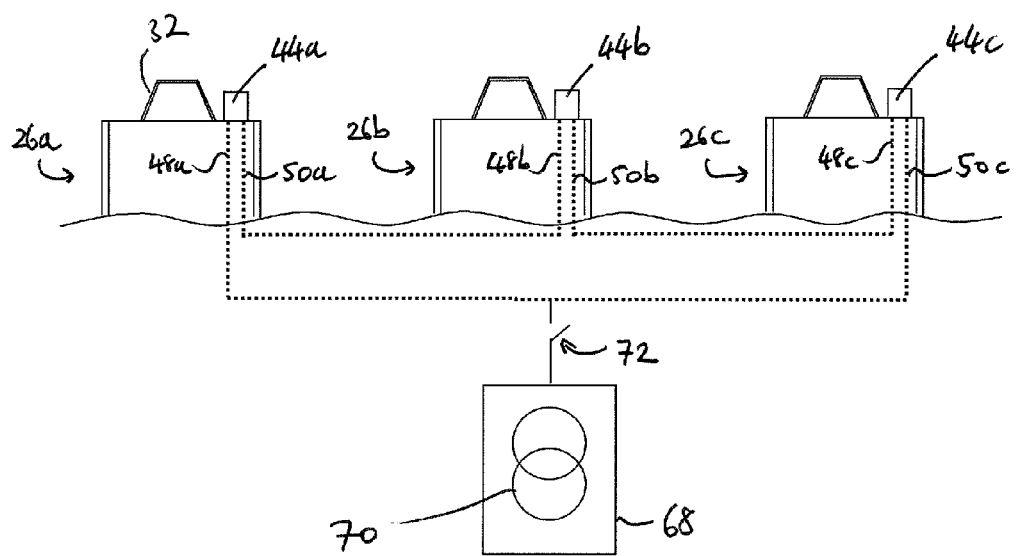
FIG. 4 is a schematic showing a plurality of offshore foundations for wind turbines in which containerised switchgear is located on the respective platforms and connected prior to erecting wind turbines on the platforms.
Figure 5:
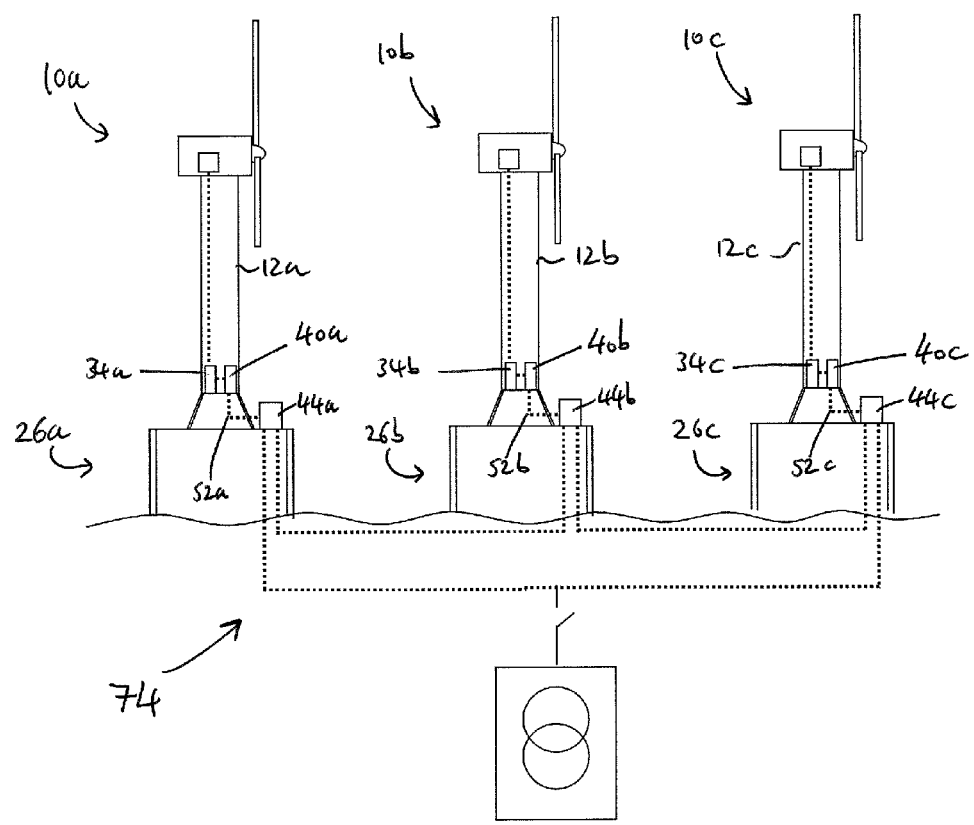
FIG. 5 shows the platforms of FIG. 4 once the wind turbines have been erected.

Locating the switchgear or part of the switchgear inside a container 46 as described above allows greater flexibility in terms of locating the switchgear, and ease of replacement of the switchgear, but it can also provide further advantages in the context of constructing a wind power plant, as will now be explainer with reference to FIGS. 4 and 5.

Referring to FIG. 4, this shows an array of offshore foundations 26a, 26b, 26c, upon which wind turbines are to be built. In this example three foundations are shown, but there would normally be many more than this for a typical offshore wind farm. The foundations 26a, 26b, 26c are often constructed a year or more before the wind turbines are installed. The transition pieces 32 are also generally installed prior to construction of the wind turbines. As shown in FIG. 4, containerised switchgear 44a, 44b, 44c is arranged on each of the foundations 26a, 26b, 26c before the wind turbines are installed. This allows the incoming and outgoing grid cables 48a-c, 50a-c to be connected and tested prior to installing the wind turbines. The grid cables 48a-c, 50a-c are connected to a substation 68, which includes a step-up transformer 70 for increasing the voltage before supplying a distribution grid (not shown). The substation includes its own switchgear 72, which allows the substation to be connected to or disconnected from the collector grid as required. It will be appreciated that the containerised switchgear 44a, 44b, 44c provides an advantage over prior art arrangements (in which the entire switchgear is located inside the wind turbine) because it allows the collector grid cabling to be installed and tested prior to installing the wind turbines.

Referring to FIG. 5, this shows wind turbines 10a-c installed on the respective offshore foundations 26a-c to form a collector grid 74. The wind turbines 10a-c each include a circuit breaker panel 40a-c inside the tower 12a-c, which is electrically connected to a respective containerised switchgear component 44-a-c on its foundation 26a-c via a wind turbine cable 52a-c in the same way as discussed above in relation to FIGS. 1 to 3.

Separating the switchgear 40, 44 in the way described above also allows the circuit breaker 40 and the transformer 34 to be tested together as a combined unit offsite before being transported to the wind turbine site.

It will be appreciated that many modifications or variations may be made to the embodiments described above without departing from the scope of the present invention as defined by the following claims. For example, whilst the containerised switchgear in the above examples comprises a pair of disconnector switches, in other examples the containerised switchgear may have only a single disconnector switch associated with either the incoming or the outgoing grid cable.

What is claimed is:

1. A wind turbine comprising:
   a tower;
   a rotor supported at an upper end of the tower;
   a generator coupled to the rotor to convert mechanical energy of the rotor to electrical energy;
   a transformer for increasing the voltage output of the generator prior to supplying a collector grid; and
   a switchgear arranged between the transformer and the collector grid, wherein the switchgear comprises:
      a first switching device coupled with the transformer, and
      a second switching device coupled with:
         a first cable connecting the first switching device with the second switching device, and
         a second cable and a third cable connecting the second switching device to a first wind turbine in the collector grid and a substation associated with the collector grid.

2. The wind turbine of claim 1, wherein the first switching device comprises a circuit breaker panel.

3. The wind turbine of claim 1, wherein the second switching device comprises at least one cable disconnector panel for connecting and disconnecting the wind turbine to/from the collector grid.

4. The wind turbine of claim 1, wherein the first switching device is located inside the tower.

5. The wind turbine of claim 1, wherein the first switching device is located adjacent to the transformer.

6. The wind turbine of claim 1, wherein the second switching device is located inside a container.

7. The wind turbine of claim 6, wherein the container is substantially weatherproof.

8. The wind turbine of claim 6, wherein the container is located outside the tower.

9. The wind turbine of claim 6, wherein the container is located on a platform.

10. The wind turbine of claim 9, wherein the platform is part of a foundation on which the tower is supported.

11. The wind turbine of claim 10, wherein the foundation comprises a structural transition piece on which the tower is supported, and the container is located within the transition piece.

12. The wind turbine of claim 6, wherein a base of the container includes access points for connecting cables to the second switching device.

13. The wind turbine of claim 12, wherein the container is supported on one or more legs such that the base is spaced apart from a supporting surface.

14. The wind turbine of claim 1, wherein the wind turbine is located offshore.

15. A wind power plant comprising a plurality of wind turbines as claimed in claim 1.

16. The wind turbine of claim 1, wherein the second cable coupled with the second switching device is connected to the substation and the third cable coupled with the second switching is connected to the first wind turbine from the second switching device.

17. The wind turbine of claim 1, wherein the second switching device is coupled to a second wind turbine and the second wind turbine is coupled to the substation such that the second switching device is coupled to the substation via the second wind turbine.

18. A wind turbine switchgear for location between a main transformer of a wind turbine and another wind turbine in a collector grid, the switchgear comprising a first switching device to be associated with the main transformer, and a second switching device to be associated with one or more cables connecting the wind turbine to the other wind turbine in the collector grid, wherein the first switching device is connected to, but located remotely from, the second switching device.

19. A method of constructing an offshore wind power plant comprising:
    installing a plurality of offshore foundations in an array;
    providing a containerised switchgear on each of the respective foundations; and
    connecting the containerised switchgear on the respective foundations to the containerised switchgear on another foundation in the array via electric cables prior to erecting wind turbines on the respective foundations.

20. The method of claim 19, further comprising:
    erecting a wind turbine on a foundation;
    providing a switchgear component inside the wind turbine; and
    electrically connecting the switchgear component to the containerised switchgear on said foundation.

21. The method of claim 20, further comprising electrically connecting the switchgear component to a transformer and testing the equipment as a combined unit prior to installing the equipment inside the wind turbine.

22. The method of claim 20, further comprising pre-installing the switchgear component inside a tower section and lifting the tower section onto the foundation.

23. The method of claim 19, further comprising pre-installing the containerised switchgear inside a transition piece on which a wind turbine tower is to be supported and lifting the transition piece onto the foundation.

* * * * *